(12) United States Patent
Dickson

(10) Patent No.: US 9,904,576 B2
(45) Date of Patent: Feb. 27, 2018

(54) METHOD AND APPARATUS IMPLEMENTED IN PROCESSORS FOR REAL-TIME SCHEDULING AND TASK ORGANIZATION BASED ON RESPONSE TIME ORDER OF MAGNITUDE

(71) Applicant: Lawrence J. Dickson, National City, CA (US)

(72) Inventor: Lawrence J. Dickson, National City, CA (US)

(*) Notice: Subject to any disclaimer, the term of this patent is extended or adjusted under 35 U.S.C. 154(b) by 0 days.

(21) Appl. No.: 15/475,828

(22) Filed: Mar. 31, 2017

(65) Prior Publication Data

US 2017/0206108 A1 Jul. 20, 2017

Related U.S. Application Data

(62) Division of application No. 15/208,507, filed on Jul. 12, 2016, now Pat. No. 9,645,853, which is a division of application No. 14/044,458, filed on Oct. 2, 2013, now Pat. No. 9,411,641.

(60) Provisional application No. 61/722,209, filed on Nov. 4, 2012, provisional application No. 61/709,981, filed on Oct. 4, 2012.

(51) Int. Cl.
*G06F 9/46* (2006.01)
*G06F 9/48* (2006.01)

(52) U.S. Cl.
CPC .................... *G06F 9/485* (2013.01)

(58) Field of Classification Search
None
See application file for complete search history.

(56) References Cited

U.S. PATENT DOCUMENTS

| | | | |
|---|---|---|---|
| 4,323,142 A | 4/1982 | Bittar | |
| 4,742,335 A | 5/1988 | Vogt | |
| 5,247,675 A | 9/1993 | Farrell et al. | |
| 5,504,894 A | 4/1996 | Ferguson et al. | |
| 5,659,759 A * | 8/1997 | Yamada | G06F 13/26 710/262 |
| 5,887,191 A | 3/1999 | Adiga et al. | |
| 5,946,466 A | 8/1999 | Adiga et al. | |

(Continued)

OTHER PUBLICATIONS

International Search Report in counterpart PCT application No. PCT/US2013/063591, dated Jun. 17, 2014.

(Continued)

*Primary Examiner* — Sisley Kim
(74) *Attorney, Agent, or Firm* — Chen Yoshimura LLP

(57) ABSTRACT

A task scheduling method is disclosed, where each processor core is programmed with a short list of priorities, each associated with a minimum response time. The minimum response times for adjacent priorities are different by at least one order of magnitude. Each process is assigned a priority based on how its expected response time compares with the minimum response times of the priorities. Lower priorities may be assigned a timeslice period that is a fraction of the minimum response time. Also disclosed is a task division method of dividing a complex task into multiple tasks is; one of the tasks is an input gathering authority task having a higher priority, and it provides inputs to the other tasks which have a lower priority. A method that permits orderly shutdown or scaling back of task activities in case of resource emergencies is also described.

1 Claim, 9 Drawing Sheets time

(56) References Cited

U.S. PATENT DOCUMENTS

| | | | |
|---|---|---|---|
| 6,421,702 B1 * | 7/2002 | Gulick | G06F 9/4812 |
| | | | 712/225 |
| 6,757,897 B1 | 6/2004 | Shi et al. | |
| 6,894,603 B2 | 5/2005 | Kim et al. | |
| 7,054,931 B1 | 5/2006 | Candan et al. | |
| 7,107,590 B2 | 9/2006 | Bril et al. | |
| 7,171,479 B2 | 1/2007 | Buchanan et al. | |
| 7,293,136 B1 | 11/2007 | More et al. | |
| 7,512,718 B2 | 3/2009 | Dickson | |
| 7,822,882 B2 | 10/2010 | Dickson | |
| 2009/0070772 A1 * | 3/2009 | Shikano | G06F 9/5027 |
| | | | 718/106 |
| 2010/0077399 A1 * | 3/2010 | Plondke | G06F 9/4818 |
| | | | 718/103 |

OTHER PUBLICATIONS

IPRP in counterpart PCT application No. PCT/US2013/063591, dated Apr. 7, 2015.
Welch, "Graceful Termination—Graceful Resetting", OUG-10: Applying Transputer Based Parallel Machines, pp. 310-317, 1989.
Verhulst, "RE: Occam-Tau—the natural successor to Occam-Pi—or is there one already?", Oct. 3, 2012, http://occam-pi.org/list-archives/occam-com/maillist.html, 4 pages, printed from the internet.
May, "Re: Programming prioritisation", Oct. 1, 2012, http://occam-pi.org/list-archives/occam-com/maillist.html, 6 pages, printed from the internet.

* cited by examiner

Legend:  ⊐── Female Connector  ←── Male Connector
(May be virtual if within a CPU)

METHOD AND APPARATUS IMPLEMENTED IN PROCESSORS FOR REAL-TIME SCHEDULING AND TASK ORGANIZATION BASED ON RESPONSE TIME ORDER OF MAGNITUDE

BACKGROUND

Field of the Invention

This invention relates to task scheduling and task organization in processors.

Description of the Related Art

A real-time program is one that is guaranteed to respond correctly within a certain fixed time period after its task requirement is presented to it. This can include multiple task requirements, or even an ongoing stream of task requirements, each of which expects its response within a specified time of its pertinent data's being presented. Complex real-time programming may include pertinent data from asynchronously independent sources. Frequently, a real-time system may be required to respond in an unusual or speedy fashion to an "exceptional" datum, with or without abandoning its standard processing or output.

Real-time problems are not solved by processing speed alone. Processing speed determines the amount of time between the presentation of full input data, timing stimuli, and programming and the completion of calculations that determine an output dependent on those alone. Though the programming is usually fully present, the data and stimuli may depend on complex interactions that are not fully understood, especially in rare so-called "exceptional" cases. Full testing of a complex system is usually impossible, since combinations of variables increase exponentially in the number of variables, and permutations thereof (taking account of order) increase as a factorial. For example, of 10 variables there are $2^{10}=1,024$ combinations, and $10!=3,628,800$ permutations.

It has therefore long been clear that one critical requirement is to break down a real-time task into subtasks, each with few variables, that interact in a way about which conclusions can be drawn. This meshes well with the ability of multiple computing devices to communicate with one another, and with the recent development of individual computing chips that have multiple "cores," each of which can be working on a different subtask at the same time. Even single cores permit independent response to different stimuli (interrupts) and multiple time-shared programs (multitasking). However, major difficulties have arisen in getting the benefit of these facts, which it will be the business of the present invention to address.

Each subtask must be real-time if the combination of them is to be real-time. But in practice a great dynamic range opens up between the expected response requirement of different subtasks. For example, an interrupt response may have to be less than a microsecond, while a database search may take 10 seconds or more—a factor of over seven "orders of magnitude" (common logarithmic units, or multipliers of 10). A slow task can delay the output of a fast task, which is clearly devastating. Task priorities attempt to deal with this, but are often counterproductive (priority inversion).

Rare, so-called "exceptional" cases, as mentioned above, may not only have a completely different time requirement but use completely different programming, and yet share the same system resources. All too often, orderly sidetracking or shutdown of the "normal" programming is a goal too complex to be solved. A crude reboot is the commonly observed sequel, whether in desktop computers or in modern, computerized city buses. In a high-value complex, whether a nuclear power plant or a steel mill, this is not an acceptable solution.

In addition to nesting of component real-time subtasks within a task, it is clearly desirable to have multiple tasks working side by side and scarcely affecting each other. This apparently simpler problem has also suffered difficulties, due to contests over shared resources, and the heaping up of tasks without discipline. Common experience includes the "stammering" of video and music on a home computer.

The use of multiple pre-emptive priorities in dealing with manifold real-time response requirements is well known. Customarily, the highest priority is denoted 0, and greater priority numbers denote lower priorities. When a higher priority process comes ready on a core, it can interrupt any running process of a lower priority, and can place itself on a processing queue of pending processes of its own priority. A typical design will reach for better real-time response by increasing the number of these priorities, sometimes as high as 256.

Because these processes must communicate with each other, complicated interactions are possible, including "priority inversion," when a higher-priority process is effectively delayed by being dependent on a lower-priority one. This leads to design unpredictability. Because of this, another school of thought leans toward reducing the number of priorities as low as two (as in the Inmos Transputer, and in many common CPUs and embedded chips which offer uninterruptible Interrupt Service Routines or ISRs and a main program which can be interrupted by the ISRs). Recently some designers of XMOS have even gone as far as advocating only one priority on multicore chips which can serve independent stimuli with independent cores.

In any core that is running multiple processes, resources must be shared so that no process is "starved" or prevented from progressing. This leads to a requirement, at least in the lower priorities, for timeslicing so that one process's long loop does not exclude others of its own priority. Processes, especially high-priority ones, also yield place by blocking on communication.

Whatever their priority scheme, chips must be coded so as most effectively to use their response capabilities, a nontrivial development task to which much prior art has been dedicated on the part of both schools. (Compare "Rate Monotonic Analysis", mentioned in U.S. Pat. No. 7,107,590.) Particularly rich have been the lines of development descending from the Inmos Transputer and its natively parallel language, occam. These have mastered both complex coding and data flows and, at the same time, cycle-counted response times to stimuli that give conclusive real-time results as long as the task requirement is not too demanding. However, the territory at which these meet—especially when multiple asynchronous stimuli may each have a real-time requirement—is not well covered and has typically been left to the complicated RTOS approaches of the first school, who also have been unsuccessful in giving a understandable and robust answer.

Systems with only one or two priorities can respond inefficiently for high-priority events when other tasks are time-consuming and cannot be timesliced rapidly. Systems with a large number of priorities have complexity problems. A time-consuming task can continually pre-empt and starve a task whose priority is slightly lower. Unresponsiveness of a low-priority task can "hang up" a high-priority task that is waiting on communication, or conversely, if the high-priority task is allowed to transmit its priority to the communication partner (priority inheritance), the latter can unexpectedly outrank and deadlock an unrelated third party. There has been no general methodology that allows multiple unrelated tasks with varying real-time requirements to efficiently use the resources of either a uniprocessor or a multicore processor.

SUMMARY OF THE INVENTION

The current invention solves the problems with the prior art by using the power of multitasking or multicore hardware or programming capabilities in an effective way to subdivide the tasks into manageable parts. A first embodiment of the invention provides a task scheduling system and related method, designed to fit the nested timing requirements of complex tasks. A second embodiment of the invention provides a method which can be used to subdivide complex tasks in a way that will give a predictable real-time result when used in conjunction with the task scheduling system of the first embodiment. A third embodiment provides a method that allows tasks to be shut down or scaled back in an orderly fashion in case of resource need. The method of the third embodiment is particularly suitable for implementation in conjunction with the scheduling system of the first and second embodiment.

Given the success of the method part, to be discussed below, the expansion of hardware core count and capability per core points to a model where the software running on one real-time core is of modest complexity. The number of features, whether number of multitasking high-level programs or number of independent asynchronous inputs, is typically of the order of ten per core, or in some multicores even less.

In one aspect, the present invention provides a task scheduling method implemented in a processor having one or more logical cores for processing tasks, which includes: defining a number of pre-emptive priorities to be assigned to sequentially programmed tasks, the number of priorities being greater than two and less than ten, each priority being associated with a defined response time, wherein higher priorities are associated with shorter defined response times and wherein the defined response times for any two adjacent priorities are different by at least one order of magnitude; obtaining a plurality of sequentially programmed tasks, each task having an expected response time between input and consequent action or output; assigning one of the number of priorities to each task based on the expected response time of the task, such that the expected response time of each task is equal to or longer than the defined response time of the assigned priority, and is shorter than the defined response time of a priority lower than the assigned priority if such a lower priority exists; and scheduling the plurality of tasks to be run by the one or more logical cores of the processor based on the priorities assigned to each task, wherein tasks assigned higher priorities are scheduled to interrupt tasks assigned lower priorities on the same logical core, and wherein tasks assigned the same priority on the same logical core are scheduled on a first-come, first-served basis.

In another aspect, the present invention provides a method implemented in a processor having one or more logical cores for programming a major task which has a defined response time requirement between one or more inputs and outputs depending upon such inputs, which includes: subdividing the major task into one first task and one or more second tasks, the first task having a higher priority than the second tasks, the first task having an associated first response time requirement, each second task defining a second output and having an associated second response time requirement, so that the outputs of the major task are produced within the defined response time requirement of the major task; the first task receiving input and timing from one or more sources and using them to create one or more packets with data and timing for corresponding second tasks; and each of the second tasks receiving a packet and producing outputs based on the data and timing contained in the received packet and a state received previously by the second task to produce the second output, wherein the data and timing contained in the packet received by the second task, together with the state received previously by the second task, produces enough state to enable the second task to produce the second output within the second response time requirement.

In yet another aspect, the present invention provides a method implemented on a computer for executing tasks, which includes: executing a first task, the first task having a first required output depending on an input, and a required response time between the input and the first required output, including: (a) executing first predefined program code of the first task; and (b) upon reception of a shutdown or modification signal by the first task, wherein the shutdown signal is received before the first required output is produced: (b1) executing second predefined program code of the first task, the second program code defining a second required output which is different from the first required output; (b2) producing the second required output within the required response time of the first task without producing the first required output while reducing an amount of resources being utilized by the task; and (b3) if the shutdown or modification signal was a shutdown signal, shutting down the first task after producing the second required output; and executing a second task, the second task being executed both before and after the first task receives the shutdown or modification signal and responds to that signal by outputting the second required output and in the case of a shutdown signal by shutting down, wherein after the first task receives the shutdown or modification signal, the second task utilizes resources previously utilized by the first task, without redefining any required output of the second task.

It is to be understood that both the foregoing general description and the following detailed description are exemplary and explanatory and are intended to provide further explanation of the invention as claimed.

BRIEF DESCRIPTION OF THE DRAWINGS

FIG. 8a shows the data and control flow, and FIG. 8b shows the input and out position.

FIG. 9a shows an initial state. FIG. 9b shows a low demand state. FIG. 9c shows a timeline for low demand startup. FIG. 9d shows a high demand state.

FIG. 10a shows the normal state before the emergency alert, FIG. 10b shows the state after the alert, and FIG. 10c shows a timeline of the conversion of the states.

FIG. 11a shows a stepper control test jig, FIG. 11b shows a centralized stepper control, and FIG. 11c shows an expanded stepper control.

DETAILED DESCRIPTION OF THE EMBODIMENTS

Figure 1:
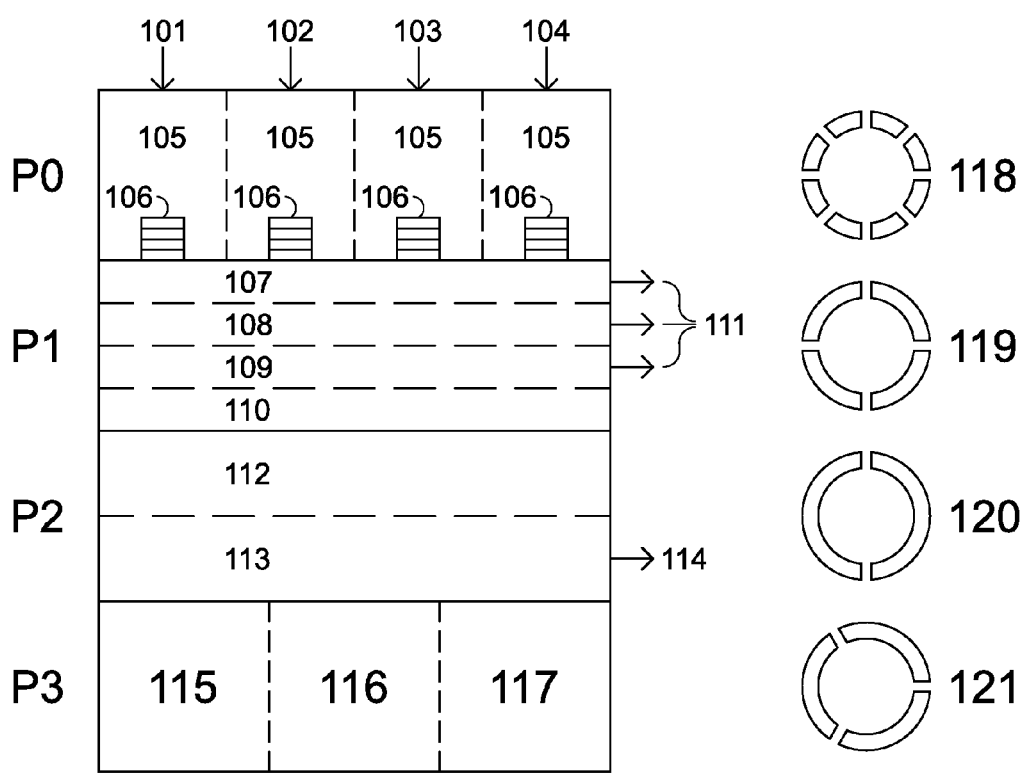
FIG. 1 schematically illustrates a task scheduling system according to a first embodiment of the present invention, implemented in a uniprocessor.

A method for real-time scheduling and task organization of multiple computing tasks is disclosed, applicable both to uniprocessors and to multicore processors. The method avoids complexity and performance uncertainty by assigning priorities and timeslicing parameters using only the order of magnitude of the required response time to input stimuli. This results in a very small number of pre-emptive priorities. The task organization specified by the method results in modest design complexity and predictable on-time performance without "push" prioritization techniques such as priority inheritance. It also permits orderly shutdown or scaling back of task activities in case of resource emergencies. A description is given of the application of this method, either by software or by designed-in hardware, to uniprocessor and multicore computing devices with external event, link, or interrupt hardware connections.

In this and all following paragraphs, precise terminology has to distinguish between cases when the task being referred to is assumed to be sequentially programmed, and cases when that is not necessarily true. A sequentially programmed task (which will also be referred to as a process) is a program, each of whose actions or instructions is either the end of the program or is followed, possibly after a wait, by exactly one action or instruction that is logically determined by the previous instruction and the state. The hardware executing a process may perform functions in parallel, as when a RISC core executes an arithmetic operation during the time when a previously triggered data read is still in process, but a process's run history must consist of a sequence, both in time and logically, of instructions or actions.

This terminology is based on CSP, which means "Communicating Sequential Processes," and is well known in the art. A task is either a process or it is composed of multiple processes, running in sequence or in parallel or both, on a single logical core or on multiple cores. In the general literature, the terms "task" and "process" are used interchangeably, but in this document the term "process" is restricted to the sequentially programmed "atoms" out of which task "molecules" are built. It is important to understand that even a uniprocessor core may have multiple processes running in parallel, with one process advancing during a wait in which another process is blocked. This is called "multitasking" and is well known in the art.

When multitasking happens, even via interrupts, a question always arises of which process runs on a single logical core when two or more processes are ready. Techniques to answer this question are called "priority." A process that has a preemptive right to run first is said to have a higher priority, which traditionally is denoted by a lower integer, so that priority 0 preempts everything else. Tasks composed of several processes may not have a uniquely defined priority. In this document, the priority of a task will be defined to be the lowest pre-emptive priority (denoted by the largest priority number) of its component processes. This corresponds to the customary terminology of the art. For instance, programs given a priority by the Linux program "nice" usually involve communication or timing driver interrupts which are of higher, in fact of top, priority.

Embodiments of the current invention solve the standoff between the two approaches, one with very large number of priorities and the other with only two or one, by using a response-time order-of-magnitude criterion to divide processes into a modest number of priorities, possibly four or eight. Because of the very wide ratio between the typical response times of each priority, the processes running under a higher priority can be treated as causing vanishingly short interruptions in processes of a lower priority.

The current invention is based on the following insight. A process that is serving a functionality with a given response time must clearly have a run-time, from input to associated output, that is less than that response time but can be of its order of magnitude without harm. This means that if it is interrupted by a process serving a functionality with a relatively much shorter response time, that one interruption will not much affect its performance, because the interruption itself is for less than the much shorter response time. If it timeshares with processes whose functionality has response time of its own order of magnitude, using a round-robin, its expected net maximum response time will be multiplied by the total number of such processes.

According to a first embodiment of the invention, each core is programmed, in either a uniprocessor or a multicore system, with a short list of priorities, each associated with a minimum response time. The minimum response times for any two adjacent priorities are different by at least one order of magnitude. Processes serving functionalities that have an expected response time equal to or longer than that minimum response time can be assigned to that priority. The expected response time of the process is the expected time between input and consequent action or output of the process. Typically, each process will be assigned to the lowest priority allowed by this criterion.

In the first embodiment, lower priorities, typically all priorities but priority 0 and sometimes priority 1, may be assigned a timeslice period that is a fraction of the minimum response time. On any given core, which fraction this may be will be influenced by typical usage and process count for that priority.

A high priority, such as priority 0 or 1, may not have a timeslice capability, typically if it is known that all tasks in that priority will block on communication after running a small fraction of the priority's minimum response time. Not having timeslice capability means the task is scheduled to run until completion or blocking on state (e.g. waiting for asynchronous input, output, timeout or event) before a next task with that priority is scheduled. The absence of timeslicing can reduce context switch overhead. In the case of the lowest priorities, context is typically very heavy and context switching must be comparatively infrequent if relative overhead is to be kept to a minimum, so timeslice periods are long.

Figure 2:
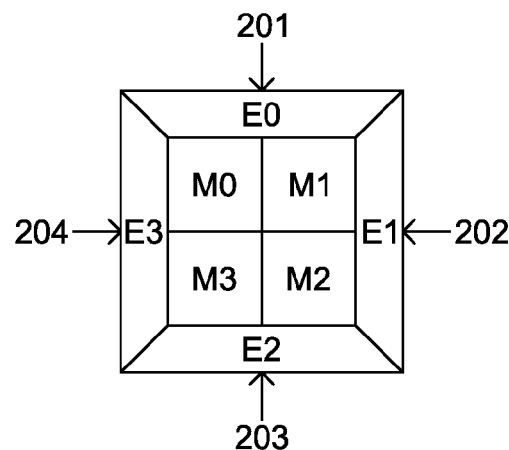
FIGS. 2 and 3 schematically illustrate a task scheduling system according to the first embodiment, implemented in a multicore processor.
Figure 3:
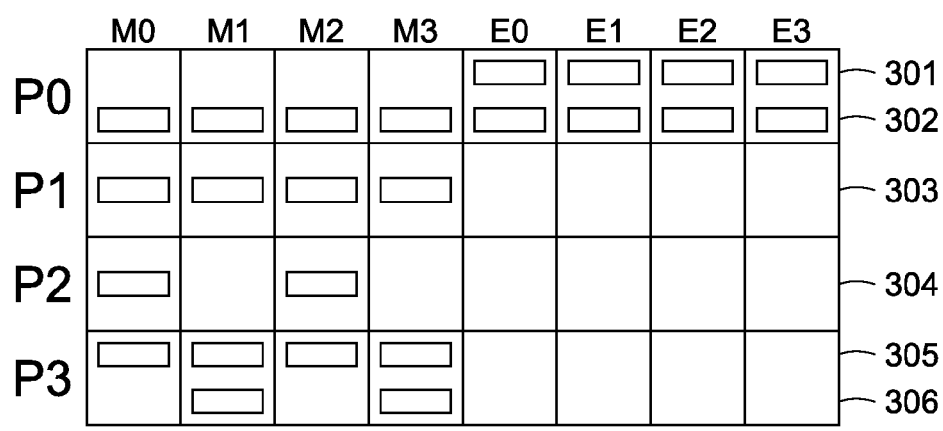

Two exemplary implementations of the first embodiment are illustrated in FIGS. 1-3, which will be described in more detail later.

Additional method and apparatus according to embodiments of the current invention permit the assumption of modest complexity per core to continue to apply, despite the possibly high complexity of the full system requirements. This requires task organization that permits full requirements to be subdivided into modestly complex subtasks which interact in a time-predictable and resource-predictable fashion. It also, in many real cases, requires orderly task shutdown or scale-back in response to unpredictable events that on occasion may make a large sudden demand on resources.

A second embodiment of the invention provides a method and apparatus for subdividing a real-time response (task) into a higher-priority task called an "input-gathering authority task," or for short an "authority task," and zero or more lower-priority "construction tasks." A construction task is started by a delivery of data and timing that forms its "foundational state," and then spends extensive effort constructing its output. An authority task collects data and timing from one or several asynchronous sources, and delivers it to the construction task or to output in an action called a "data fling." It is possible that the output of the construction task, with or without a further data fling, may be the input of a later construction task or tasks, all contributing to the real-time response to the original data, and it is also possible for multiple construction tasks to operate in parallel as part of a real-time response. Direct output from the authority task is possible (e.g. zero construction tasks) if little or no computation is needed, only passed-through data or timing of a stimulus or a combination thereof.

Figure 4:
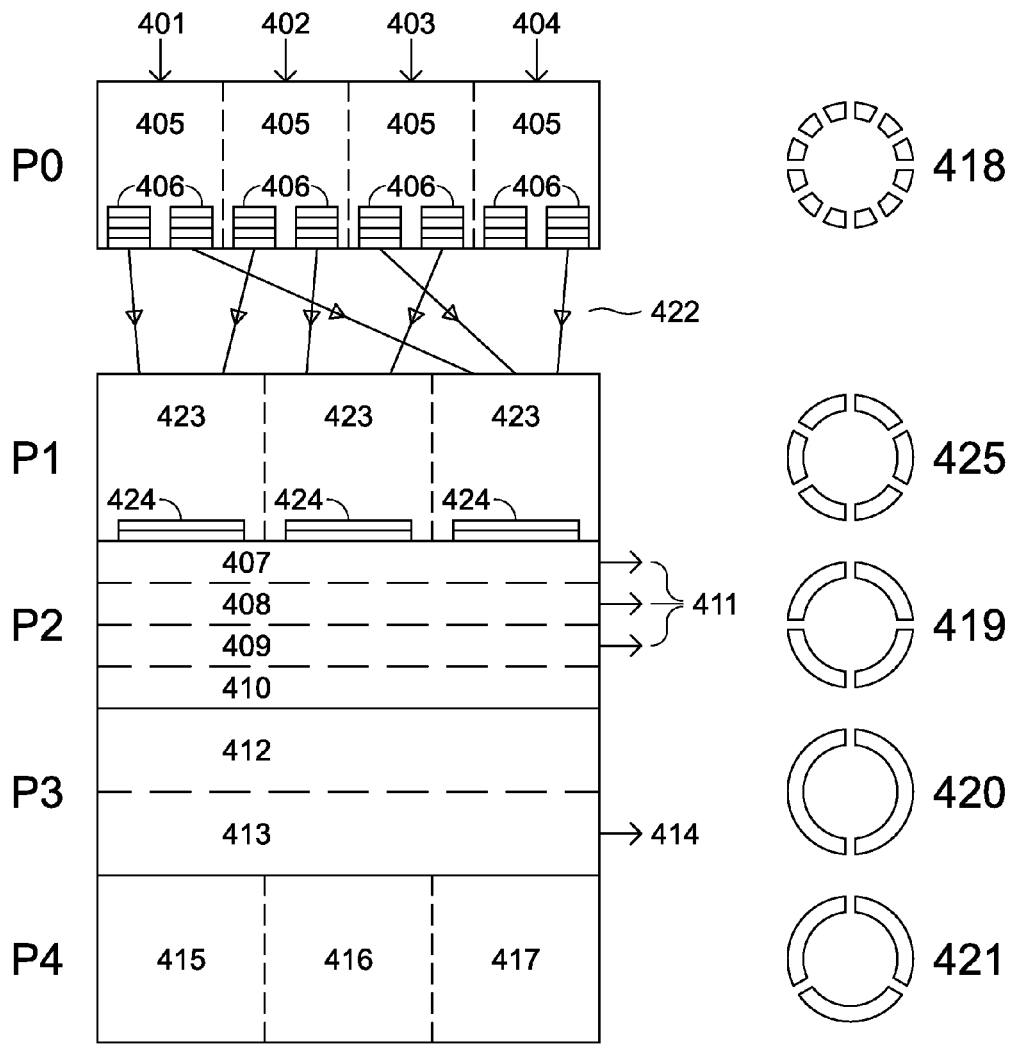
FIG. 4 schematically illustrates a task scheduling system, where a task is subdivided into a higher-priority authority task and lower-priority construction tasks, according to a second embodiment of the present invention.

FIG. 4, which will be described in more detail later, illustrates an example of how authority tasks and construction tasks are scheduled in a task scheduling system.

The design principle (the "ASAP principle") for construction and authority tasks is that the data and timing required for the foundational state of the construction task should be supplied in such a way as to permit it to begin work as soon as possible. This implies the authority task should be able to gather all the asynchronous data required for the foundational state of the construction task, should be higher priority than the construction task, and should have an output FIFO (the "fling FIFO") of priority as high as itself or at least higher than that of the construction task. This fling FIFO should also have capacity enough to buffer all the authority's data flings until the construction task comes ready to receive, and ability to transmit all buffered data in one fling to the construction task when that comes ready. In addition, the data reception by the construction task should be so designed (possible both for channel and for alternation or select) that a low-priority communication partner that comes ready later does not deschedule. By contrast, a high-priority process should deschedule while communicating a long message to or from a low-priority process, so that the actual data communication is treated as an extended act at the lower priority, and should be exempted from the typical relation between priority and response time if this is a necessary part of its function, as for an authority task or an output driver.

Figure 5:
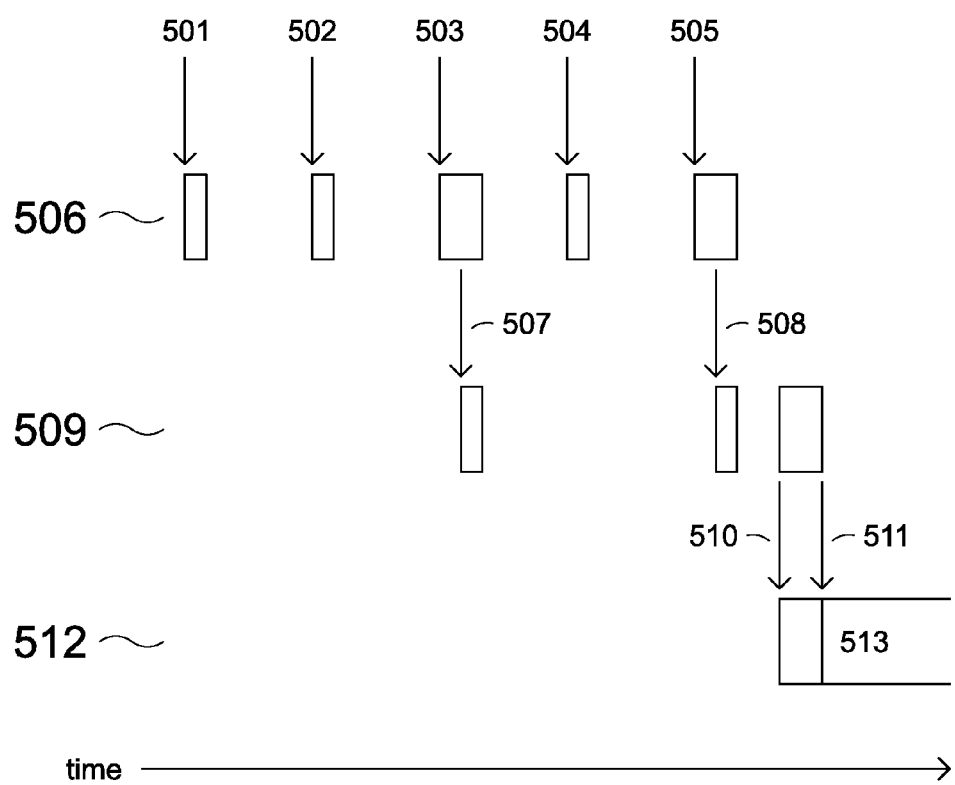
FIG. 5 schematically illustrates a timeline for foundational state delivery for a construction task according to the second embodiment.
Figure 6:
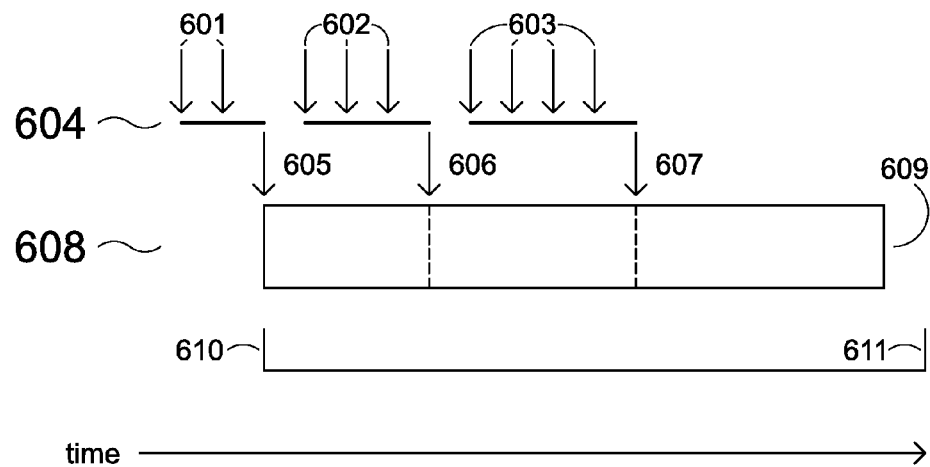
FIG. 6 schematically illustrates a timeline for input cluster response of a construction task according to the second embodiment.
Figure 7:
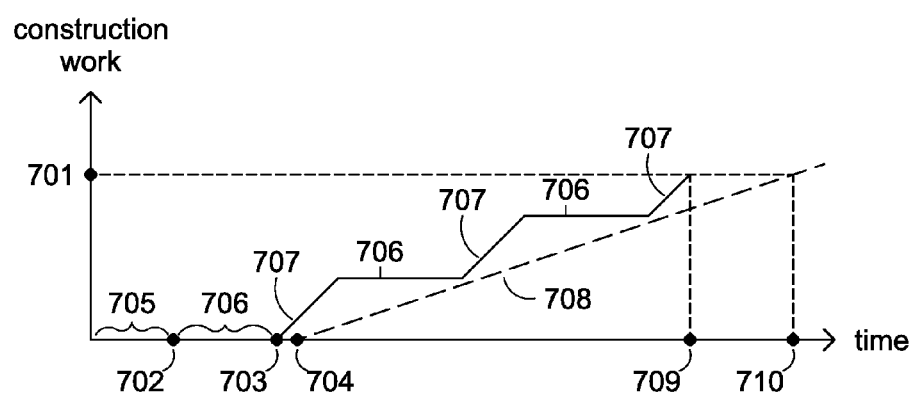
FIG. 7 schematically illustrates a conservative response time prediction for a construction task according to the second embodiment.

FIGS. 5-7, which will be described in more detail later, illustrate the operation of the authority task and construction task.

A third embodiment relates to orderly task shutdown or scale-back of tasks. This embodiment provides a method and apparatus for shutting down or modifying a task, without causing it to fail or take overly long, in the case of unexpected need for its resources, or a reduction in the ability of the system to support them. Such a situation is commonly called an "exception" but is here treated as a part of normal programming.

The third embodiment requires that, as a part of normal running, the task be receptive from time to time to a signal, here called a "shutdown signal" though it may require only a scale-back or behavior change rather than a shutdown. The shutdown signal causes a branch in the programming of the task which does three things:

(A) It may redefine the output requirement of the task (i.e. what the task is required to output), and causes it to produce its output requirement, whether redefined or not, before shutting down or when modified. It should be noted that the task may have received input before the shutdown signal whose output is still in process at the time the shutdown signal arrives. Such "in the pipeline" output will be produced and satisfy either the output requirement or the redefined output requirement. The task may also receive input after the shutdown signal and will produce output dependent on this input according to the redefined output requirement.

What the output requirement is redefined to depends on the nature of the tasks and the need of the system. In general several design principles are followed:

(1) It is safe to operate over the time period in question (until shutdown or repair).

(2) It uses resources physically close to the output (here "output" includes actuators as well as data).

(3) It is minimalistic not only from the resource and power point of view, but also from design. By abandoning resources, it makes them available to the emergency task. By using minimalistic design, it reduces variables, behaves understandably, and satisfies (1).

(4) It is optimized quite differently from the standard program. Cost-effectiveness and efficiency feedback, with its big databases and network presence, goes away (as in the example in FIG. 10). The coding of this backup or safe-mode program should usually be done separately. The point of contact is the resources used and driven. Some may actually be dedicated (i.e. fired up only when safe mode is in use).

(B) It does not cause the task to spend longer than its original response time requirement. In other words, the task to produce its new output requirements within its original response time requirement.

(C) It may permit the task being shut down or modified to return resources to the system or to other tasks operating in the system. In other words, the scale-back of normal requirements is so managed that fewer resources are needed, and the difference is then re-assigned to the emergency task.

This is a normal and functional branch of the programming, and therefore implies that the shutdown signal must spread in such a way that other tasks for which the output of (A) may be input are ready to deal with any modifications. Techniques for doing this are known in the art.

Because the resources are the same, by using the task division method of the second embodiment to subdivide the tasks both of standard and of safe mode, and by using the task scheduling method of the first embodiment to schedule all tasks, the transition between the standard and safe mode is comparatively easy.

FIGS. 1 to 3 illustrate two examples of the process (task) scheduling system according to the first embodiment of the present invention, one implemented with a uniprocessor, one implemented with a multicore processor. The uniprocessor and the multiprocessor are generic in description, with few components for simplicity, but can be modeled by real hardware such as common X86 CPUs with interrupt service, in the uniprocessor case, or XMOS or Adapteva chips with event service, in the multicore case. For optimal adaptation to the invention, additional features are described which may not yet be present in the real hardware as currently available.

In this example, the design targets are:

TABLE 1

Target Functionalities

| Item | Response time |
|---|---|
| Event1 | 1 us |
| Event2 | 1 us |
| System clock | 1 us |
| Serial byte | 5 us |
| Sound generator | 1 ms |
| Mouse | 1 ms |
| Motor1 | 2 ms |
| Motor2 | 10 ms |
| Click response | 100 ms |
| Window response | 100 ms |
| Math output | 1 s |
| Search1 output | 2 s |
| Search2 output | 2 s |

The priorities are:

TABLE 2

Priority Response Times

| Priority | Minimum response | Timeslice | Process response |
|---|---|---|---|
| 0 | 1 us | — | 100 ns |
| 1 | 1 ms | 100 us | 100 ns |
| 2 | 100 ms | 10 ms | 10 ms |
| 3 | 1 s | 100 ms | 100 ms |

In this case, the fraction described above is 1/10.

In the drawings, no internal communications or links are shown. It is not to be assumed that only areas neighboring in the drawings are connected by channels. Channel ends can connect any tasks in a core, and in the multiprocessor, can connect any two cores. The technology for this is well known, e.g. Transputer and XMOS. In the discussion to follow, "core" means hardware that can run a task, so that one "core" may in some designs consist of more than one physical core, working together in a fine-grained parallel fashion to decode and execute an instruction stream.

FIG. 1 shows the process scheduling system implemented in a uniprocessor and process rotations in such a system. Solid horizontal lines separate priorities, P0 through P3. In this depiction, each item inside the largest rectangle is a process (also referred to as a sequentially programmed task), while those outside indicate priorities (left), inputs/stimuli (top), and outputs (right). An input is a change of state forced onto the program by something outside of it (example: transmitting a byte in via serial connection). A stimulus is an input considered from the timing point of view (sometimes that is the only thing input, the fact that the event has happened). An output is state forced by the program onto the outside world.

The inputs (stimuli) Event1 101, Event2 102, System Clock 103, and Serial Byte 104 are received in P0. Each pair of P0 processes consists of an input ISR (Interrupt Service Routine) 105 feeding a FIFO 106. The FIFO may be of any depth, and may be software or hardware. Its depth is designed to decouple input from the accepting lower-priority processes, which may be any of the ones below (not shown). Note that the term "FIFO" as used in this disclosure can refer to any combination of software and hardware that performs the FIFO receiver function.

Priority 1 processes are Sound generator 107, Motor1 108, Motor2 109, and Mouse 110, and the first three have external outputs 111. Priority 2 processes are Click response 112 and Window response 113, outputting to graphics 114. The low priority P3 processes are Math output 115, Search1 output 116, and Search2 output 117. These feed back through channels to higher-priority processes to be output (not shown). This technology is known and predictable. Specifics on coding channels are well known to those skilled in the art.

To the right of FIG. 1 the process rotations are shown. Eight processes rotate in Priority 0 and can thus be expected to respond in 800 ns worst case. Four processes in Priority 1 can be expected to respond in 400 us, plus a small additional burden due to Priority 0 interrupts. Two processes in Priority 2 can be expected to respond in 20 ms plus interrupt burdens. Three processes in Priority 3 can be expected to respond in 300 ms plus interrupt burdens. These are all within the minimum response time constraints, though P0 is rather tight.

Note that the tasks shown here are merely examples; the system can handle any tasks.

FIG. 2 shows the 8-core multicore processor design that fits this embodiment. The cores E0 through E3 are edge cores, specialized for responsiveness to input stimuli. The cores M0 through M3 are mid-cores, specialized for processing and output. The inputs (stimuli) Event1 201, Event2 202, System Clock 203, and Serial Byte 204 are shown, but outputs are not shown, to enhance drawing clarity.

FIG. 3 shows the process distribution among the cores. E0 through E3 specialize in rapid response to stimuli and each have only P0 processes, stimuli 301 and FIFO 302. On the other hand, M0 through M3 respond to the edge cores. Each of them has one P0 process shown, a FIFO receiver corresponding to the FIFOs in the edge cores. (Output hardware is not shown, since any further processing may be external to this design.) Each helps with P1 303, but two processors have one P2 304 and one P3 process (math output 305), while two have no P2 process, but two P3 processes, math output 305 and a search output 306. Under the typical assumption that most processor time in P0, P1, and P2 is idle, the example shows total of almost 3.0 cores dedicated to math calculations.

The same process rotation and latency calculations can be carried out on FIG. 3 as were done for FIG. 1. Now no core has more than 200 ns response time in P0, and response times in all the other priorities are similarly reduced. In this way, the embodiment shows its capability of exploiting the cores of a multiprocessor to increase the robustness of a real-time design in a decided way. As the number of cores scales up, so does the number of real-time tasks that can reliably be handled by this design, including greater CPU dedication to low-priority high-bandwidth computational tasks, in parallel with increasing capacity to handle communication-heavy tasks whose response times may differ by a large dynamic range.

The priorities and tasks of FIG. 1 and Tables 1 and 2 apply also to the multiprocessor design, but the tasks are distributed among the cores and thus the process rotation counts are reduced. Also, there is a slight reduction of the "interrupt burden" at each lower priority level, where the interrupt burden is defined as the proportion of processor time stolen by all processes of higher priority than the given priority.

As mentioned earlier, in a second embodiment of the present invention, a task may be subdivided into a higher-priority authority task and zero or more lower-priority construction tasks. In cases where more than one asynchronous input contributes to the foundational state of a construction task, authority tasks can be added in the process scheduling system, an example of which is shown in FIG. 4. In this example, all authority tasks are placed at a priority just below the highest, and lower priority numbers are increased by 1. Other strategies could be followed but are not explored here. This embodiment involving separate authority tasks is essentially the same in the uniprocessor case and the multiprocessor case; interrupt burden will be ignored in the drawings.

FIG. 4 is a variant of FIG. 1, and also refers to Tables 1 and 2, with appropriate changes of priority numbers. The reference numbers 4xy in FIG. 4 are equivalent to 1xy in FIG. 1, for xy between 01 and 21, and the description is equivalent to that of FIG. 1 for those. However, it is notable that there are twice as many FIFOs 406 as there are FIFOs 106, and the software process rotation 418 has 50% more processes than 118. This means that the value of hardware FIFOs increases in the FIG. 4 case, reducing the high-priority task count by 67% instead of 50%.

The new Priority 1 has three authority tasks 423, each gathering input from more than one raw input via FIFOs 406. These internal channels are shown in 422; other internal channels are omitted. The fling FIFOs 424 transmit foundational state to lower-priority tasks below. As indicated by 425, the new Priority 1 will become much more efficient if the fling FIFOs are also implemented in hardware. Notice that one Priority 0 task (the one accepting 404) is its own authority task (left FIFO 406) for an unspecified construction task that needs only one input.

Not shown in FIG. 4 are other possibilities for authority tasks. They can gather input from lower-priority tasks, since a higher pre-emptive priority task acts like a soft interrupt, nearly instantaneously, when receiving from lower priority given low interrupt burden. It is also possible for a single authority task to govern more than one construction task, as would be particularly appropriate for command packets under a protocol system.

FIG. 5 shows a timeline for foundational state delivery and shows how the ASAP principle for construction and authority tasks is implemented. Note that the in this and other figures, the time durations in the timelines are not to scale. All kinds of input are delivered to the construction task at once, avoiding extra cycles through the slow task rotation if multiple kinds arrive at different times. Raw input 501 through 505 is formed by the authority task 506 into data flings 507 and 508 to the fling FIFO 509. It is supposed that 501, 502, and 504 are one kind of input and 503 and 505 are the other kind of input, and that both kinds are needed to build a foundational state. Meanwhile, competition from other low-priority tasks of its priority delays the construction task 512 until it is rescheduled at time 510, and the compounded foundational state data fling spans the time from 510 to 511, after which work 513 commences.

The design is deliberately friendly to long timeslices for low-priority construction tasks, which may be able to loop over several inputs in the "quick construction" case. As FIG. 5 shows, these can bunch up and still be dealt with after only one latency (sum of all the other members of the round robin at the low priority). The conditions on the fling FIFO, and the data reception non-descheduling condition (between 510 and 511), suffice to guarantee this if the data cluster arrives together or before the construction rescheduling.

FIG. 6 shows a timeline for input cluster response of a construction task. It is assumed that an empty fling FIFO and completion of all previous construction is the situation at the left. The fling FIFO 604 shows a heavy black horizontal line for all times when it is nonempty and blank for all times when it is empty. Two flings 601 come from the authority and are delivered 605 to the construction task when it is rescheduled. It begins work (in a loop) and consumes 601 by time 606, but three more authority flings 602 have arrived by then.

The non-descheduling property of the receiver causes the construction task to continue shortly after receiving data fling 606, and similarly after receiving four more authority flings at 607. No more are forthcoming in this burst; it completes work at 609, and deschedules, restoring the state of an empty fling FIFO and completion of all construction. The timeslice that it could have used stretches from 610 to 611, but it closes down early in this example. In general, a construction task that does not wait for data after foundational state is established will therefore not deschedule, except for timeslicing, before finishing the work on its data cluster. If, in the algorithm required to generate the real-time response, new asynchronous data is required after some calculation, then a new construction task is started at that point.

The action shown in FIG. 6 involves both (a) the possibility of more than one input being sent to construction at the same time, as a "cluster", assuming the construction loops fast enough; and (b) the likelihood that authority task and construction tasks will be long-lived, and in their lifetime deal with more than one real-time response with latency less than the real-time requirement, even though the total lifetime of the tasks may be far longer than the real-time requirement. Thus, for example, a real-time radio CDMA receiver may go on running for an hour even though it is required to respond to each incoming signal within a 100 msec time delay.

A conservative bound on its real-time response is therefore possible. Let b equal the upper bound on its interrupt burden during the work to be undertaken for a worst-case input cluster, and W be the maximum work on that cluster (counting construction task cycles only, and including reception time for the foundational data fling). Let S be the maximum sum of timeslices for all other processes of the same priority, and T its timeslice. Therefore $S \le (n-1)T$, where n is the number of processes of this priority, but it may be less if some of the other processes are known never to use up one timeslice.

Then time to completion $\le R$, where $$R = S + \left(\frac{S+T}{T}\right)\left(\frac{1}{1-b}\right)W$$

This formula is to a degree recursive, but since it is an upper bound it can be approximated easily from above.

FIG. 7 illustrates a conservative response time prediction. The heavy line is the actual progress on the construction work 701, while the dashed line is the conservative estimate. Higher-priority calculation time, as for the authority task, is assumed negligible and not shown. The input cluster begins at 702, and work begins at 703, which is before the estimate 704 based on the upper bound S on the response delay of the construction task. Time before raw input, with no work underway, is 705, while wait time for the rotation to reach the low-priority construction task is 706. During timeslices 707, work proceeds at relative rate between 1−b and 1, shown by a slope less than 45 degrees. There may be other periods 706 when the task is swapped out. Here work is shown going at the minimum relative rate, and swapouts are shown taking maximum time. The slope of the conservative estimate line is $(1-b)T/(S+T)$ and therefore the actual completion 709 is at or before the completion time 710 predicted by the formula for R.

This task organization is applicable to both the uniprocessor embodiment and the multiprocessor embodiment. The multiprocessor allows n and hence S to be reduced, and by distributing the inputs and authority tasks it allows b to be reduced, which implies that this design can make near-full utilization of the available processors, as long as tasks (including efficiently farmed-out parallel tasks) outnumber cores.

This depends on the efficiency of the data flings, as well as the task organization. Therefore both embodiments are naturally aided by some components being implemented in hardware. First, as noted above, are the FIFOs of both kinds shown: if implemented in hardware they lead to a 50% or more reduction in process count in the highest priorities, which will proportionately reduce b for construction tasks. A second is data channels between tasks, whether on the same core or on different cores. This art was traditionally well supported on the Transputer and is available on modern multicore chips from companies like XMOS and Adapteva, but their descheduling behavior may require adjustment to fit the design of the present embodiments.

A particularly desirable multicore feature available in the standard art is wormhole routing, classically found on the Amatek 2010, Intel Touchstone Delta and iWarp, and the Transputer T9000 design, and currently part of the IE 1355 and Spacewire protocols supported by 4Links and others. This permits software to specify a channel connection even between tasks on different cores, and the transmission is managed efficiently through hardware routing of small "flits," without cluttering each core with many mux and demux router tasks. In order to satisfy the ASAP principle for this design, one of two approaches can be taken. If many hardware channels are available, complete networks can be dedicated to each order of magnitude of message size, preventing long messages from blocking short ones and driving up worst-case latency per unit of data transmitted for short messages. (Note that very high-priority processes typically do not transmit long messages to each other, because of the priority to response-time relation.) The other solution is for messages requiring wormholes to be subdivided into small packets. This means requiring each authority task to be on the same core as its construction task, so as not to require a wormhole, which may increase the number of authority tasks required.

The low count of priorities means that the partial ordering of processes is lighter than in the fully ranked approach. Processes of nearly the same response time are incomparable, unrelated processes of slower response time have no effect, and unrelated processes of faster response time become part of the interrupt burden without causing deadlock or priority inversion. Analysis of a given real-time response thus becomes provably independent of others when the data itself is independent.

The behavior of the construction tasks is analogous to "value-added" production in economics, and is tractable even for complex real-time systems. Using the above-described sequencing tools and methods, a real-time requirement, which requires certain output within a certain time after the arrival of the last of certain input necessary to generate the output, is subjected to top-down design as a major task, which is broken up in series or in parallel or both into construction tasks which receive timely foundational state from authority tasks and progress directly to production of output which may be final output of the real-time requirement or intermediate output contributing to foundational state of later construction tasks. Because of the analogy of this design technique with the known function of designing the value-added subcontracting of economic projects involving communication, dependency, and timing, this approach will be called "value-added" in following discussion.

Some practical examples of implementations of the embodiments are described with references to FIGS. 8a-11c. In some of the FIGS. 8a, 9a, 9b, 9d, 10a, 10b, 11a-c) that depict nested rectangles, outermost rectangles refer to CPUs in implementations, while their included rectangles refer to cores or sets of cores or independent multitasking tasks or sets of tasks or combinations of these. Lines external to outermost rectangles refer to external means of communication, while lines internal to outermost rectangles refer to communication within the CPU, and in both cases the line of communication is understood to include the programmed protocol of communication between the joined entities. Not all internal communication lines are drawn.

The use of "value-added" production (construction tasks) is particularly well adapted to real-time systems that have available a wealth of hardware cores, whether single cores (as in many robotics applications) or multicores. Virtually all modern CPU cores offer an accurate, readable timer with very fine resolution. This means that components of a real-time constrained system can apply delay control (e.g. FIGS. 8a and 8b). Here point-to-point low-bandwidth communication from an authority task assigns precisely timed high-bandwidth work, such as stepper motors, to construction tasks on embedded cores. Should upsets occur in the data flow, the embedded programming may branch to continue on schedule with estimated data.

Figure 8A:
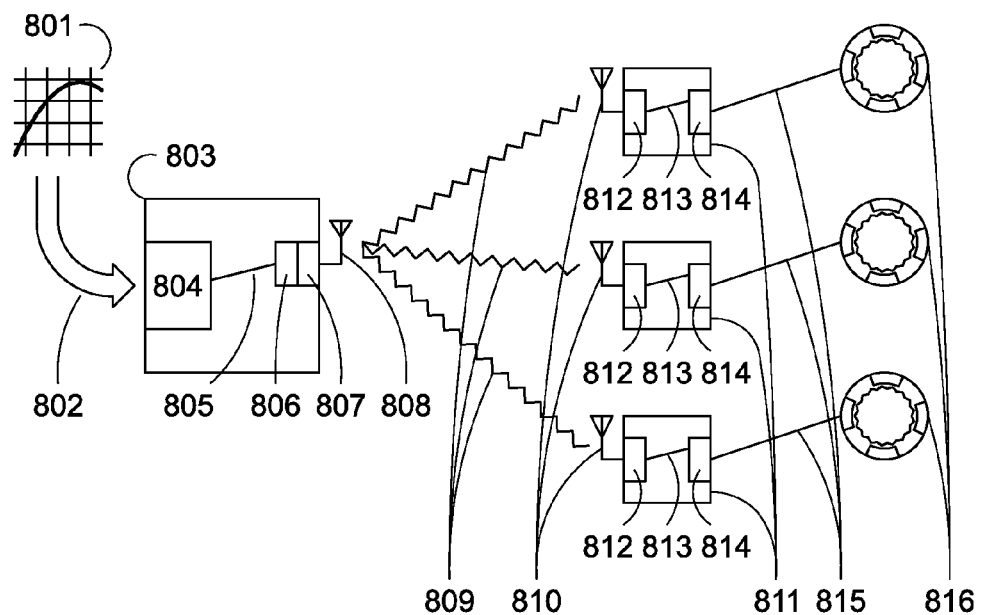
FIGS. 8a and 8b schematically illustrate a stepper motor follower design, which is a specific implementation of the second embodiment.
Figure 8B:
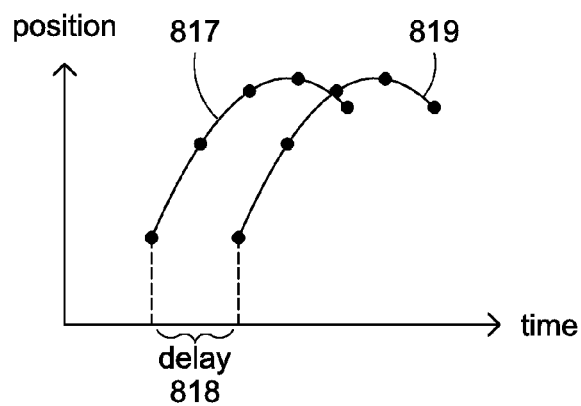

FIGS. 8a and 8b schematically illustrate a stepper motor follower design. FIG. 8a shows the data and control flow, and FIG. 8b shows the input and output position. In FIG. 8a, a target position curve 801 is captured and communicated 802 (means not shown) to a master CPU 803 that includes a target position analysis program 804 which generates commands of positioning and timing which it communicates 805 to an authority task 806 for stepper motor drivers. This authority task uses a Bluetooth driver 807 to drive an antenna 808 to send signals 809 through air or space to an antenna 810 for each stepper assembly. The timing of the Bluetooth 10 is in the millisecond range, though the information may include timing information that is finer.

Low-level CPUs 811 each include a Bluetooth receiver 812 which communicates 813 with an analog stepper driver 814. The programming is capable of producing output with microsecond-range timing that is not interfered with by the Bluetooth reception, a task that is not difficult with modern art of low-level CPUs given the simplicity of the task assigned to this CPU. The analog signals 815 drive stepper motors 816 which position the actuator in pursuit of the target position curve.

FIG. 8b shows one possible strategy for such positioning. The captured target with true timing 817 is delayed by a fixed time 818 to produce the true target 819. Although there are delays and jitter in the external communications in the millisecond range, the delay 818 is set to be greater than the maximum possible value of this enforced delay, and transmitted timing information plus the accuracy of CPUs 811 therefore allows the delay to be kept constant to within a microsecond range.

A second, related application of "value-added" is to expansion, in which needed construction tasks spread among a sea of cores that may start idle (FIG. 9). Again the signaling is low-bandwidth and the construction tasks know what to do. There may be bottlenecks at shared resources like external network connections or databases. Again, great care must be taken with timing, and data guessing applied where needed.

Figure 9A:
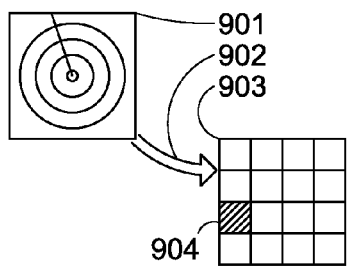
FIGS. 9a-9d schematically illustrate processing of radar reception data using multiple cores, which is a specific implementation of the second embodiment.
Figure 9B:
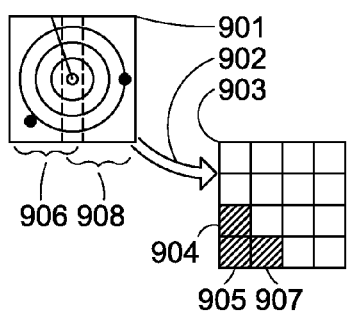

In FIG. 9a, radar reception data 901 is communicated 902 (means not shown) to a multicore processor 903 with programming to analyze and use it. Use and output are not shown. In FIG. 9a (initial state), the radar is detecting nothing, and therefore only the main program core 904 is active, while all auxiliary cores are idle. In FIGS. 9a, 9b and 9d, each core, denoted by a small square within processor 903, may refer to an actual physical core of that processor, or to a set of physical cores working together.

In FIG. 9b (low demand state), the radar reception 901 is showing light target activity. In response to this, the main program core 904 activates one auxiliary core 905 to handle the left side of the screen 906 and one more auxiliary core 907 to handle the right side of the screen 908. There is overlap corresponding to the width of a target. Implied, but not shown, is the fact that data corresponding to the screen is available for reading both by 905 and 907. Though in theory multiple reads of the same data do not interfere, in computing practice these may be sequentialized at some level, and the delays introduced by this fact must be designed into the timing analysis of the system of FIGS. 9b and 9d.

Figure 9C:
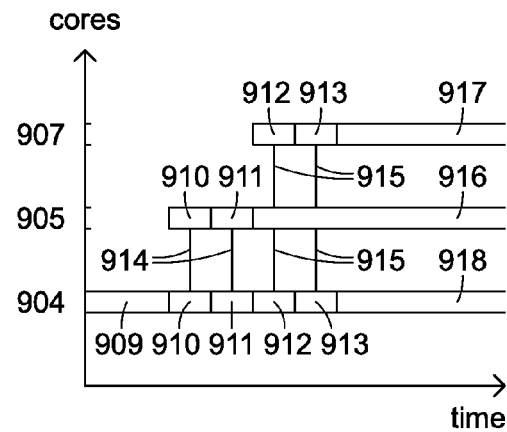
Figure 9D:
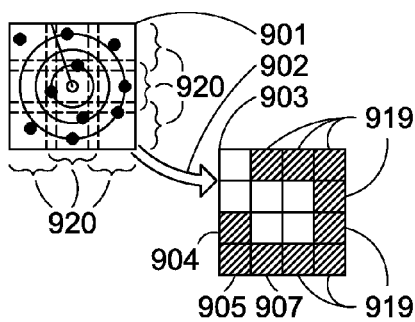

FIG. 9c shows a timeline of the expansion of core usage during the transformation from the state of FIG. 9a to that of FIG. 9b, in the case where the core 904 acts in a uniprocessing fashion. The numbers 904, 905, and 907 on the left refer to cores. The period 909 uses the core arrangement of FIG. 9a but detects or anticipates the light target activity. 910 activates core 905, with or without passing code to core 905, and 911 sends setup data to core 905 including its share 906 of the screen. 912 activates core 907, with or without passing code to core 907, and 913 sends setup data to core 907 including its share 908 of the screen. The communications synchronizing the activities of 904 and 905 during 910 and 911 are denoted by 914, and the communications synchronizing the activities of 904 and 907 during 912 and 913 are denoted by 915. The lines 915 are taken to pass under the bar denoting 905 without making contact. The activity of 905 after activation is denoted by 916, the activity of 907 after activation is denoted by 917, while the activity of the main program core 904 after the setup negotiations of 905 and 907 is denoted by 918. Further communications, which may include data passing or further screen-territorial negotiations, are not shown.

FIG. 9d, a high-demand state, is in principle similar to 9b, but employs more cores and does a two-dimensional subdivision of the screen. Seven new cores 919 are activated in a manner similar to the way 905 and 907 were activated. The negotiations are similar to FIG. 9c but include negotiation with 905 and 907 to change their screen territories. The nine new territories 920 overlap and contest the read resource, requiring a recalculation of the delay overhead possible due to such read contention.

When contraction is called for, such as when the power has failed and a system must conserve auxiliary power, or when a demanding new task (e.g. "MELTDOWN ALERT" in a nuclear power plant) must conscript most resources, the "value-added" approach continues to permit predictable success. To continue the economic analogy, it must arrange "layoffs", "reductions in hours", and "transfers" (FIG. 10). The signaling to do this is once again low-bandwidth, and the programming is in place. Preplanned poor output takes the place of the full-stream output, and if shutdown is a requirement, shutdown takes place in orderly fashion. On the other hand, if shutdown is not OK, the poor-resource scaled-back version of the normal tasks continues at full required speed until the state of emergency is past.

Figure 10A:
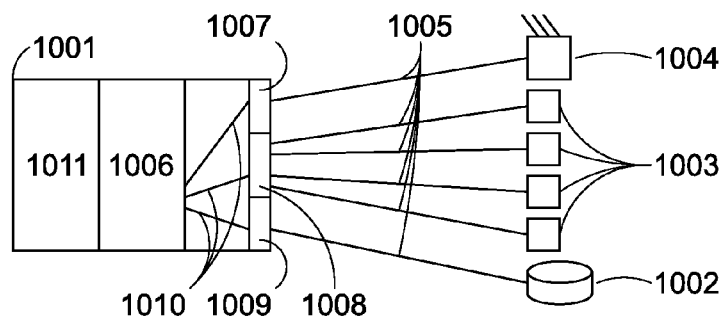
FIGS. 10a-10c schematically illustrating scaling back of normal task in response to an emergency task according to the third embodiment.
Figure 10B:
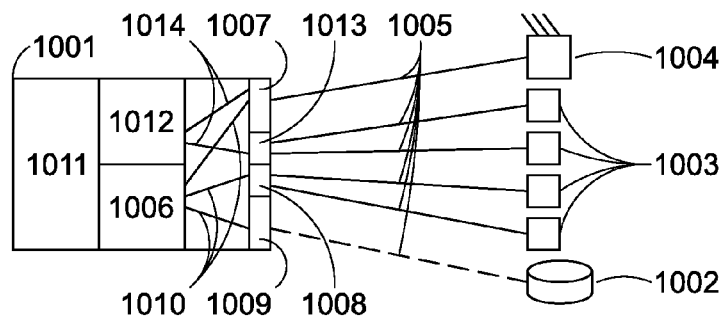
Figure 10C:
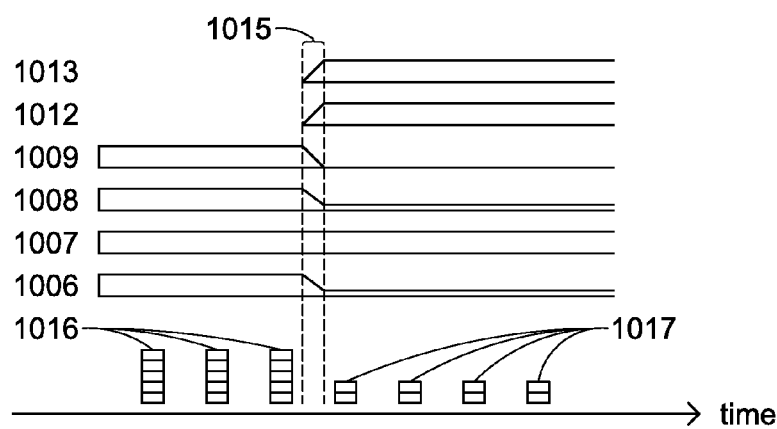

FIGS. 10a-10c show a scale-back which includes the shutdown of one resource. The resources shown are a CPU 1001, a database disk 1002, four sensors or actuators 2003, and a shared network connection 1004. Communication among these is provided by links 1005.

FIG. 10a shows the "normal" configuration before the emergency demand. A normal master program 1006 controls network driver 1007, sensor and actuator drivers 1008, and disk database driver 1009. The master program controls each driver via internal links 1010. Spare resources on the CPU 1011 are assumed to be available to respond to unexpected emergencies.

FIG. 10b shows the "scaled-back" configuration of the normal task 1006, sharing resources with the emergency task and its master program 1012. The communicating links 1010 between normal task and drivers are unchanged. The new master controls three of the sensors or actuators through a new driver 1013 that took them over from 1008, which now retains only one. Two new links 1014 allow the emergency task to control the new driver 1013 and to share the network resource 1007. Finally, the database disk 1002 has been deactivated and the link to it is now inactive, which means that its driver 1009, though still loaded, is asleep.

FIG. 10c shows a timeline of the conversion between the state of 10a to that of 10b as it affects some of the activities. The graphs to the right of 1006, 1007, 1008, 1009, 1012, and 1013 show the resource utilization of those tasks or drivers. The normal task 1006 scales back. The network 1007 stays the same, but most of it is now dedicated to the emergency task 1012. The normal sensor and actuator driver 1008 becomes less active because it is divested of 75% of its duties. The disk database driver 1009 becomes completely inactive. The emergency task 1012 and its sensor and actuator driver 1013 come on the scene and dominate the effort after the transition period 1015. The negotiations that take place during this transition period 1015 are not shown; they are in nature similar to FIG. 9c but more complex, and the art of doing this is known. However, the normal output, shown along the bottom of FIG. 10c, changes to fit the design of this invention. The packets are still provided at the expected rate, but the normal packets 1016 are more extensive than the scaled-back emergency packets 1017, using estimates to replace the data formerly supplied by the database disk 1002, and freeing up output bandwidth on the shared network connection 1004 so that the emergency task has room.

Figure 11A:
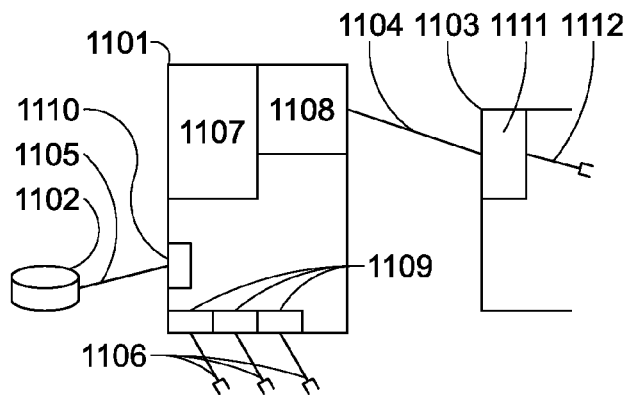
FIGS. 11a-11c schematically illustrate test and replacement, where a prospective replacement component to be tested separately from the system, which is a specific implementation of the second embodiment.
Figure 11B:
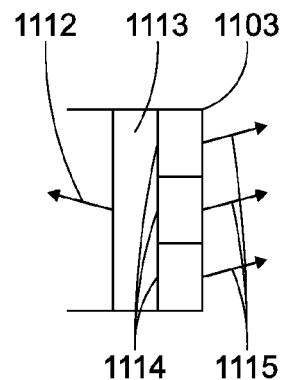
Figure 11C:
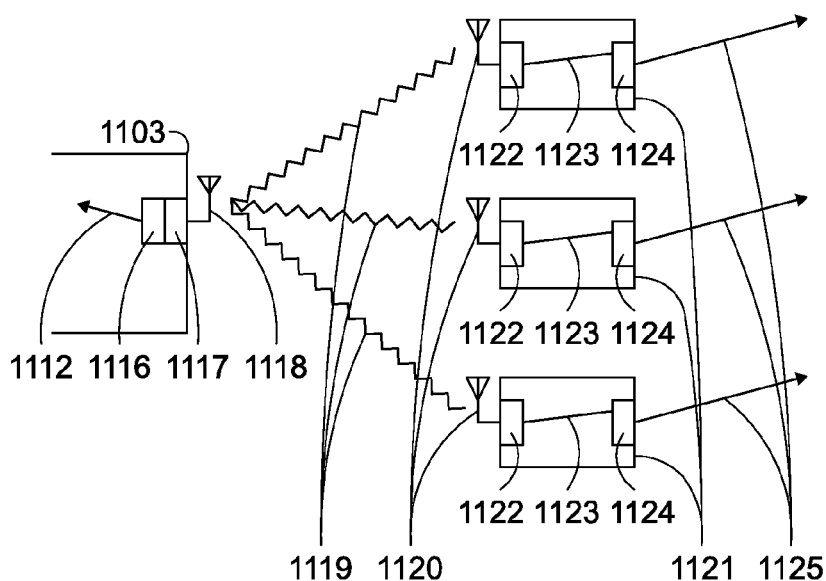

Finally, the "value-added" design of this invention is well adapted to nesting and remapping. This is because each task, with its component subtasks, is well defined in terms of input, output, and timing. This makes it possible for a prospective replacement component to be tested separately from the system (FIGS. 11a-11c). FIGS. 11a-11c show the extended Bluetooth version of the stepper control of FIG. 8a replacing a centralized control after testing by a test jig that accommodates both.

The boundary of the stepper control as defined in FIGS. 11a-11c is, on FIG. 8a, defined on the left by internal link 805 and on the right by analog stepper links 815. It is immaterial that part of the boundary cuts through the middle of a CPU, because according to this invention it cuts between tasks and through an internal communication link 805 that has a known protocol. Similarly, it is immaterial that the boundary on the right side 815 is not digital, because its analog voltage values and timing are controlled and are thus the equivalent of a protocol. It is assumed as standard engineering good practice that the motor side 816 of this analog connection is much higher impedance than the analog drivers of the stepper controls, which implies that the stepper control does control the voltage and timing.

FIG. 11a shows a test jig, necessary to qualify the replacement of a stepper control. It consists of a special CPU 1101, a data disk 1102, and a standard CPU 1103 which corresponds to 803 in FIG. 8a. The special CPU 1101 is connected to the other parts by a CPU-to-CPU link 1104, probably but not necessarily similar to the incoming data link 802 in FIG. 8a, and a disk cable 1105. Three analog connections 1106 emulate the connections on the stepper motors 816 of FIG. 8a. A main test program 1107 creates the equivalent of target position data which is sent by a data driver 1108 along connection 1104. In parallel, three highly responsive analog input drivers 1109 are ready to record the output from a stepper control and send it to a disk driver 1110, which may also source data for the target position data simulation.

On the standard CPU 1103, a data receiver 1111 converts input from 1104 to the protocol expected for commands of positioning and timing sent across 805 in FIG. 8a. This could be a copy of 804 in FIG. 8a, or a simulator of it. It is required (for conservative testing) that the resources and timing consumed by 1111 be greater than or equal to those consumed by 804 in FIG. 8a. The link 805 in FIG. 8a is represented as 1112 here.

FIG. 11b shows a centralized stepper control. It occupies part of a standard CPU 1103, and has the internal link 1112 that corresponds to 805 in FIG. 8a as one boundary. The authority task 1113 corresponds to 806 of FIG. 8a, but instead of a Bluetooth driver it has three high-speed analog output drivers 1114 suitable to act as stepper motor drivers, which drive the analog lines 1115, identical to 815 in FIG. 8a, and able to connect to 1106 on the test jig. The microsecond timing required here is a difficult task unless the standard CPU is a powerful multicore.

FIG. 11c shows an extended stepper control, identical to the one in FIG. 8a. Features 1116 through 1125 are identical to 806 through 815 in FIG. 8a, respectively. Feature 1112 corresponds to 805 in FIG. 8a. The standard CPU 1103 in this case must be Bluetooth-capable but otherwise does not have to be as powerful as the one required by 11b.

This kind of redesigning will be successful on any level, as long as the requirements of the invention are adhered to.

As mentioned above, the fling FIFOs may be implemented by software or hardware. Hardware FIFOs may be preferred. A hardware FIFO typically has the highest priority. A FIFO implemented by software or a hardware and software combination will be assigned a priority in accordance with the embodiments described earlier.

The task scheduling system described above may be implemented by software or hardware. Hardware implementation may be preferred due to speed, and is expected to lead to major real-time performance improvement. The descheduling of a high-priority process but not of a low-priority process under some communication conditions, described above in the paragraph about the ASAP principle, may also best be implemented in hardware.

It will be apparent to those skilled in the art that various modification and variations can be made in the method and related apparatus of the present invention without departing from the spirit or scope of the invention. Thus, it is intended that the present invention cover modifications and variations that come within the scope of the appended claims and their equivalents.

I claim:

1. A method implemented on a computer for executing tasks, comprising:
   executing a first task, the first task having a first required output depending on an input, and a required real-time response time between the input and the first required output, including:
   (a) executing first predefined program code of the first task; and
   (b) upon reception of a shutdown signal by the first task, wherein the shutdown signal either requires a shutdown of the first task or requires only a scale-back or modification of the first task, wherein the shutdown signal is received before the first required output is produced:
      (b1) executing second predefined program code of the first task, the second program code defining a second required output which is different from the first required output;
      (b2) producing the second required output within the required real-time response time of the first task without producing the first required output while reducing an amount of resources being utilized by the task; and
      (b3) when the shutdown signal required a shutdown of the first task, shutting down the first task after producing the second required output; and
   executing a second task, the second task being executed both before and after the first task receives the shutdown signal and responds to that shutdown signal by outputting the second required output and in the case of a shutdown signal by shutting down, wherein after the first task receives the shutdown signal, the second task utilizes resources previously utilized by the first task, without redefining any required output of the second task, wherein the first and second tasks are subdivided into a higher-priority and one or more lower-priority tasks having first and second predefined program codes.

* * * * *